( 12 ) United States Patent
Inaba et al.

(10) Patent No.: US 12,182,696 B2
(45) Date of Patent: Dec. 31, 2024

(54) SPIKING NEURON DEVICE AND COMBINATORIAL OPTIMIZATION PROBLEM CALCULATION DEVICE

(71) Applicant: Nippon Telegraph and Telephone Corporation, Tokyo (JP)

(72) Inventors: Kensuke Inaba, Musashino (JP); Hiroki Takesue, Musashino (JP); Toshimori Honjo, Musashino (JP); Takahiro Inagaki, Musashino (JP); Takuya Ikuta, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 976 days.

(21) Appl. No.: 17/272,540

(22) PCT Filed: Aug. 30, 2019

(86) PCT No.: PCT/JP2019/034169
§ 371 (c)(1),
(2) Date: Mar. 1, 2021

(87) PCT Pub. No.: WO2020/050172
PCT Pub. Date: Mar. 12, 2020

(65) Prior Publication Data
US 2021/0326684 A1 Oct. 21, 2021

(30) Foreign Application Priority Data

Sep. 4, 2018 (JP) .................................. 2018-165397

(51) Int. Cl.
*G06N 3/067* (2006.01)
*G06N 3/049* (2023.01)
(52) U.S. Cl.
CPC ............. *G06N 3/067* (2013.01); *G06N 3/049* (2013.01)

(58) Field of Classification Search
CPC .............................. G06N 3/067; G06N 3/049
See application file for complete search history.

(56) References Cited

U.S. PATENT DOCUMENTS

2015/0269482 A1  9/2015  Reddy et al.
2016/0162798 A1  6/2016  Alireza et al.
(Continued)

FOREIGN PATENT DOCUMENTS

| JP | 2015114354 A | * | 6/2015 |
| JP | 2015-163922 A |  | 9/2015 |
| WO | 2015/156126 A1 |  | 4/2017 |

OTHER PUBLICATIONS

Yamamoto, Yoshihisa, et al. "Coherent Ising machines-optical neural networks operating at the quantum limit." npj Quantum Information 3.1 (2017): 49. (Year: 2017).*
(Continued)

*Primary Examiner* — Andrew T Chiusano
(74) *Attorney, Agent, or Firm* — Workman Nydegger

(57) ABSTRACT

To provide a spiking neuron apparatus able to efficiently implement a simulation of a spiking neuron. A spiking neuron apparatus using a coherent Ising machine, the coherent Ising machine including: a resonator unit for amplifying a plurality of optical pulses; a measurement unit for measuring phases and amplitudes of the optical pulses to obtain a measurement result; and a feedback configuration for computing and feeding back an interaction related to a certain optical pulse using a coupling coefficient of Ising Model on the basis of the measurement result, the feedback configuration feedback inputting correlation determined by two coupling coefficients with opposite signs to two predetermined optical pulses of the optical pulses, the spiking neuron apparatus simulating a state of a spiking neuron using one of values of two optical pulses finally obtained by the measurement unit.

6 Claims, 6 Drawing Sheets

(56) References Cited

U.S. PATENT DOCUMENTS

| | | | |
|---|---|---|---|
| 2017/0024658 A1* | 1/2017 | Utsunomiya | G01R 33/1284 |
| 2018/0246393 A1* | 8/2018 | Inagaki | G06N 10/00 |
| 2019/0019100 A1* | 1/2019 | Roques-Carmes | G06N 3/084 |
| 2023/0102145 A1* | 3/2023 | Inaba | G06N 3/049 |
| | | | 703/2 |
| 2023/0153677 A1* | 5/2023 | Takesue | G06N 5/01 |
| | | | 706/45 |

OTHER PUBLICATIONS

Marandi, Alireza, et al. "Network of time-multiplexed optical parametric oscillators as a coherent Ising machine." Nature Photonics 8.12 (2014): 937-942. (Year: 2014).*

Inagaki, Takahiro, et al. "Collective and synchronous dynamics of photonic spiking neurons." Nature communications 12.1 (2021): 2325. (Year: 2021).*

"The Coherent Ising Machine Shows the Most Promise in Quest for Quantum Computing," NTT Research, available at <https://ntt-research.com/in-quest-for-quantum-computing-the-coherent-ising-machine-shows-the-most-promise/> 2024. (Year: 2024).*

Haribara, Yoshitaka, et al. "Performance evaluation of coherent Ising machines against classical neural networks." Quantum Science and Technology 2.4 (2017): 044002. (Year: 2017).*

T. Inagaki, Y. Haribara et al, *A Coherent Ising Machine for 2000-Node Optimization Problems*, Science vol. 354, Issue 6312, (2016), pp. 603-606.

\* cited by examiner

SPIKING NEURON DEVICE AND COMBINATORIAL OPTIMIZATION PROBLEM CALCULATION DEVICE

TECHNICAL FIELD

The present invention relates to a spiking neuron apparatus for simulating a spiking neuron, and more particularly to a spiking neuron apparatus using an optical parametric oscillator (OPO).

BACKGROUND ART

A model that configures a neural network using spiking neurons is referred to as a spiking neural network. The mode is an artificial neural network model that is made with emphasis on an action potential and spiking dynamics to approximate the neural network closer to the biological brain function.

The spiking neural network regards a timing at which a spike occurs as information. So it can treat more parameters and is said to be a next-generation technology that can treat a wider range of problems than the deep learning.

In addition, generally, a neural network processing that is implemented on a von Neumann computer based on sequential processing will result in a lower processing efficiency, and the spiking neural network will result in an even lower processing efficiency because it needs to imitate even the action potential. Therefore, the simulation of the neural network is often implemented on a dedicated processor.

CITATION LIST

Patent Literature

[PTL 1] WO 2015/156126

Non Patent Literature

[NPL 1] T. Inagaki, Y. Haribara et. al, "A coherent Ising machine for 2000-node optimization problems", Science 354, 603-606 (2016)

SUMMARY OF THE INVENTION

Technical Problem

Unfortunately, a problem will arise that because dedicated processors manufactured from semiconductor perform electrical signal processing, dedicated processors with spiking neurons implemented thereon will take a longer processing time.

In addition, it is known that there are generally two types of neurons of a biological system with respect to their behaviors when the spiking occurs.

The dedicated processors manufactured from semiconductor have a problem that it is difficult to freely control the type of spiking.

The present invention addresses the above conventional problems. A purpose of the present invention is to provide a spiking neuron apparatus able to efficiently implement a simulation of a spiking neuron.

Means for Solving the Problem

To solve the above problems, a spiking neuron apparatus is provided according to one embodiment, the spiking neuron apparatus using a coherent Ising machine, the coherent Ising machine including: a resonator unit for amplifying a plurality of optical pulses; a measurement unit for measuring phases and amplitudes of the optical pulses to obtain a measurement result; and a feedback configuration for computing and feeding back an interaction related to a certain optical pulse using a coupling coefficient of Ising Model on the basis of the measurement result, the feedback configuration feeding back correlation determined by two coupling coefficients with opposite signs to two predetermined optical pulses of the plurality of optical pulses, the spiking neuron apparatus simulating a state of a spiking neuron using values of two optical pulses finally obtained by the measurement unit.

DESCRIPTION OF EMBODIMENTS

Embodiments of the present invention will be described in more detail below.

A spiking neuron apparatus according to this embodiment implements the state of one spiking neuron on two OPO pulses of a coherent Ising machine. The coherent Ising machine includes a resonator unit, a measurement unit, and a feedback configuration. The resonator unit amplifies a plurality of optical pulses (OPO pulses). The measurement unit measures the phase and amplitude of the optical pulses to obtain the measurement result. The feedback configuration computes and feeds back an interaction related to a certain optical pulse using a coupling coefficient of the Ising Model on the basis of the measurement result. A description is given here of the coherent Ising machine, which achieves the spiking neuron apparatus according to this embodiment.

Coherent Ising Machine

The conventional known von Neumann computer has not been able to efficiently solve the combinatorial optimization problems classified into the NP problem. As a technique to solve the combinatorial optimization problems, a technique is proposed that uses the Ising Model that is a lattice model in which statistical mechanical analysis is given for a magnetic material using interaction between spins arranged at the sites of the lattice points.

It is known that the Hamiltonian H, which is the energy function of the system of the Ising Model, is represented as shown by the following expression (1).

Formula 1

$$H = \Sigma_{ij} K_{ij} \sigma_i \sigma_j + \Sigma_i h_i \sigma_i \quad (1)$$

In expression (1), $K_{ij}$ is a coupling constant, which represents correlation at each site that configures the Ising Model.

In addition, $h_i$ is a magnetic field term. $\sigma_i$ and $\sigma_j$ represent spin of each site and take values of 1 or −1.

When solving the combinatorial optimization problem using the Ising Model, $\sigma_i$ is determined, in which the system is in the stable state and the energy H takes the minimum value, when $K_{ij}$ and $h_i$, which are correlation and magnetic field at each site, are given in the Hamiltonian of the Ising Model. The optimum solution is thus obtained. A coherent Ising machine has recently drawn attention as a calculation device that may solve the combinatorial optimization problems such as the NP problem (PTL 1 and NPL 1). The coherent Ising machine simulates the Ising Model pseudoly using the optical pulses.

Figure 1:
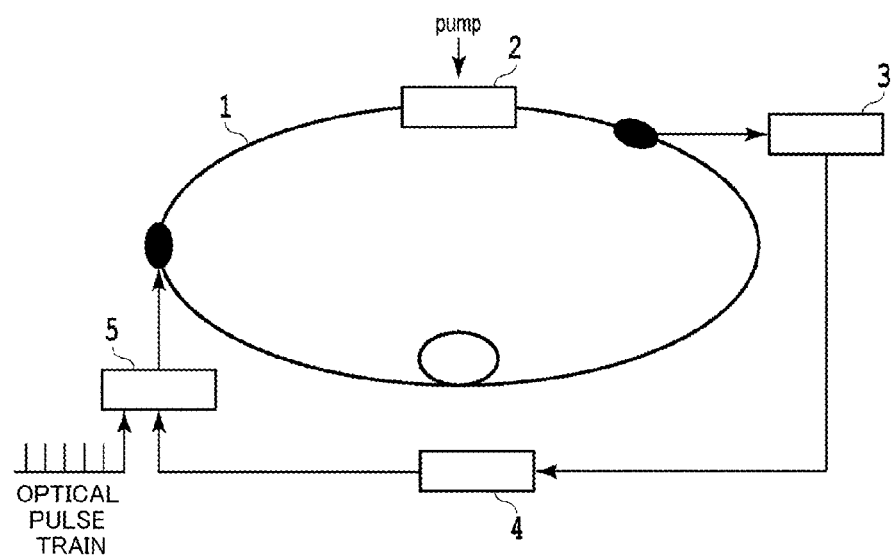
FIG. 1 shows a basic configuration of a coherent Ising machine.

FIG. 1 shows the basic configuration of the coherent Ising machine. As shown in FIG. 1, the coherent Ising machine includes a ring optical fiber that functions as a ring resonator 1 and a phase sensitive amplifier (PSA) 2 provided in the ring resonator 1. The coherent Ising machine is configured to generate a train of a number of optical pulses corresponding to sites in the Ising Model by injecting pump optical pulses (pump) to the phase sensitive amplifier 2 (binarization to 0 or π phase with optical parametric oscillator (OPO)). The ring resonator 1 and the phase sensitive amplifier 2 together configure the resonator unit.

Also as shown in FIG. 1, the coherent Ising machine includes a measurement unit 3 that measures an optical pulse train, a computing unit 4 that provides a feedback to the optical pulse on the basis of the measurement result, and an external optical pulse input unit 5.

An optical pulse train is input to the ring resonator 1. When the optical pulse train goes around and reaches the PSA 2 again, pump light is input to the PSA 2 again to amplify the optical pulse train. The optical pulse train generated by the first injection of pump light is a weak light pulse of an unfixed phase. The phase state gradually becomes fixed by the optical pulse train being amplified by the PSA 2 every time it goes around the ring resonator 1. As the PSA 2 amplifies each optical pulse at a phase of 0 or π relative to the other phase of the pump light source, the phase of the optical pulse becomes fixed at one of the phase states 0 or π.

The coherent Ising machine is implemented such that spin 1 and −1 in the Ising Model corresponds to the phase 0 and π of the optical pulse. The measurement unit 3 outside the ring resonator 1 measures the phase and amplitude of the optical pulse train each time the optical pulse goes around. The computing unit 4 is previously provided with a coupling coefficient Kij and computes, using the input measurement result, a coupling signal (a signal to be feedback input) for the ith optical pulse.

$$\sum_j K_{ij} C_j \qquad \text{Formula 2}$$

(cj: the amplitude of an optical pulse at the jth site)
Additionally, the external optical pulse input unit 5 generates an external optical pulse in response to the computed coupling signal and inputs it into the ring resonator 1. The above feedback loop control may allow the coherent ising machine to add correlation to the phase between the optical pulses configuring the optical pulse train.

The coherent Ising machine may find a solution of the Ising Model by circulating and amplifying the optical pulse train in the ring resonator 1 while adding the correlation and by measuring the phase 0 and π of the optical pulses is in the stable state.

The configuration of the coherent Ising machine shown in FIG. 1 is an example. For example, the feedback configuration in FIG. 1 is configured by the computing unit 4 and the external optical pulse input unit 5. The feedback configuration may be configured such that instead of the external optical pulse input unit 5, a modulator is provided in the ring resonator 1 to modulate the optical pulse circulating and propagating in the ring resonator 1. A coherent Ising machine that may be used in the spiking neuron apparatus according to this embodiment is not limited to the configuration shown in FIG. 1 and may be other configurations such as a known configuration including a resonator unit, a measurement unit, and a feedback configuration.

Simulation of Spiking Neurons

Figure 2:
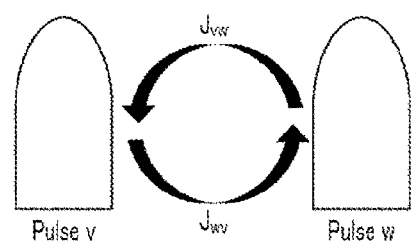
FIG. 2 illustrates an implementation of spiking neurons.

FIG. 2 illustrates implementation of the spiking neurons. The spiking neuron apparatus according to this embodiment feedback inputs the correlation described below to two OPO pulses (optical pulses) configuring the coherent ising machine. Here, the correlation is determined by two coupling coefficients with opposite signs.

In this embodiment, for 2N (N is a natural number) optical pulse trains Cj (j is an integer of 1-2N inclusive), the first half is defined as $v_i$ (i is an integer of 1-N inclusive) and the second half is defined as $w_i$. As shown in FIG. 2, the spiking neuron apparatus according to this embodiment uses $J_{vw}$ and $J_{wv}$ (=−$J_{vw}$) as the coupling coefficient of the optical pulse (Pulse) v and the optical pulse w that belong to the same i. The spiking neuron apparatus uses both the values of the optical pulses v and w calculated as described above to simulate the state of one spiking neuron. In other words, 2N optical pulses are used to simulate N neurons.

When the coherent Ising machine shown in FIG. 1 is used to configure the spiking neuron apparatus, the computing unit 4 performs computation by the following expression (2) using the measurement result Cj of the optical pulse that is subjected to coherent measurement by the measurement unit 3.

Formula 3

$$\alpha_i = \sum_j J_{ij} C_j + F_i \qquad (2)$$

In expression (2), $F_i$ is a magnetic field term. Jij is correlation determined by the coupling coefficient and is specifically provided as follows.

$$J_{ij} = \begin{pmatrix} v_1 & v_2 & v_3 & w_1 & w_2 & w_3 \\ 0 & 0 & 0 & J_{vw} & 0 & 0 \\ 0 & 0 & 0 & 0 & J_{vw} & 0 \\ 0 & 0 & 0 & 0 & 0 & J_{vw} \\ J_{wv} & 0 & 0 & 0 & 0 & 0 \\ 0 & J_{wv} & 0 & 0 & 0 & 0 \\ 0 & 0 & J_{wv} & 0 & 0 & 0 \end{pmatrix} \qquad \text{Formula 4]}$$

The matrix shows that the pair of optical pulses $v_i$ and $w_i$ represents the state of the ith spiking neurons. In so doing, the equation that the pair of the ith v and w follows is given as the following expressions (3) and (4) (the suffix i is omitted in expressions (3) and (4)). The operation of the spiking neurons in the present device is characterized by the following expressions (3) and (4).

Formula 5

$$\frac{dv}{dt} = (p-1)v - v^3 - J_{vw}w + F_v \quad (3)$$

Formula 6

$$\frac{dw}{dt} = (p-1)w - w^3 - J_{wv}v + F_w \quad (4)$$

In expressions (3) and (4), p represents the pump light intensity and is normalized such that p=1 is the oscillation threshold. For convenience, P=p−1 may be provided. Fv and Fw are magnetic field terms.

Control of Type of Spiking Neurons

The spiking neurons are classified into two types of Type I and Type II. In Type I, when transiting from the nonfiring state (the state of no spiking) to the firing state (the state of spiking), the firing frequency (firing incidence) increases continuously from 0. In Type II, the firing frequency increases discontinuously. The spiking neuron apparatus according to this embodiment may control the type of spiking neurons to one of the two types.

If the magnetic field term is in the same condition, the spiking neuron apparatus according to this embodiment may control the type of neurons by the ratio of the pump light intensity and coupling coefficient.

Figure 3:
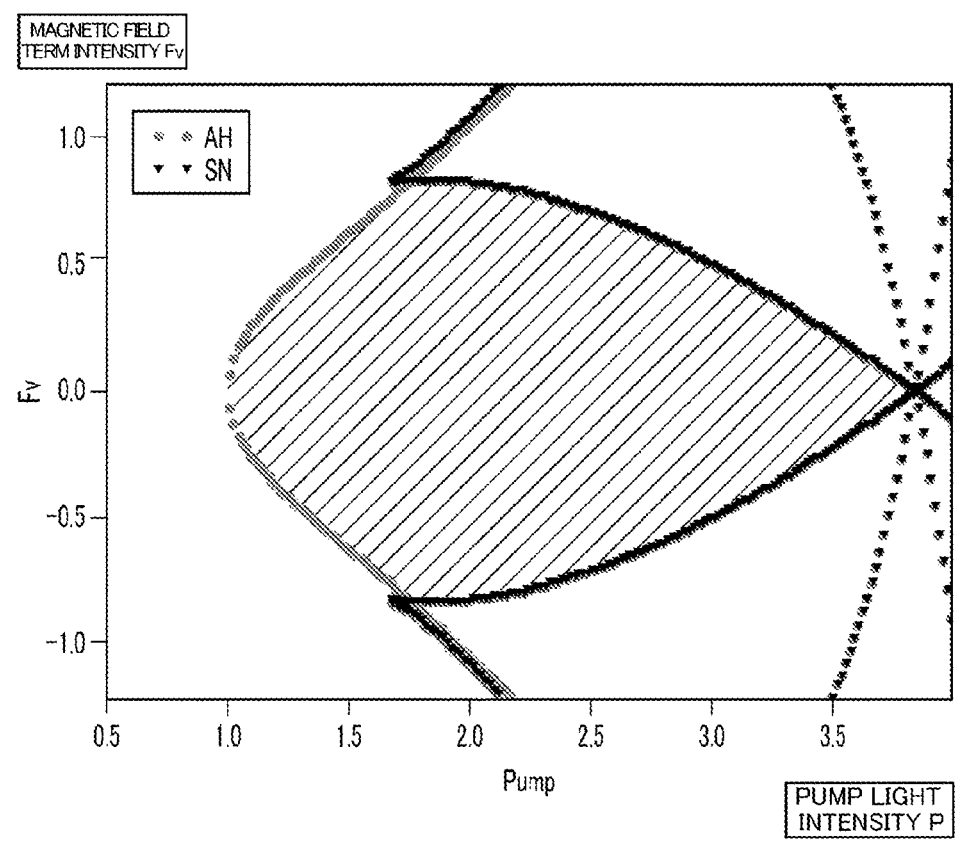
FIG. 3 shows a type and firing/nonfiring state of spiking neurons with respect to the pump light intensity for a coupling coefficient fixed at a predetermined value when an external magnetic field varies.

FIG. 3 shows the type and firing/nonfiring state of spiking neurons when the pump light intensity and the magnetic field vary for a coupling coefficient fixed at a predetermined value. In FIG. 3, the x-axis and y-axis show the pump light intensity and the magnetic field, respectively. Here, as the coupling coefficient is fixed at a predetermined value, the x-axis shows substantially the ratio of the pump light intensity and coupling coefficient. In FIG. 3, AH shows the boundary where the spiking neurons of Type II transit between the firing/nonfiring, SN shows the boundary where the spiking neurons of Type I transit between the firing/nonfiring. In addition, in FIG. 3, a hatched region bounded by the boundaries of Type II and Type I is the region where the spiking neurons are in the firing state.

The spiking neuron apparatus using the coherent Ising machine shown in FIG. 1 has a mix of light of the phase sensitive amplifier 2, i.e., an analog portion and electricity of the computing unit 4 configured by FPGAs, i.e., a digital portion. The portions are coupled to each other using AD conversion. Therefore, it is difficult to estimate the relative relationship (intensity ratio) of freely settable parameters of the device such as the pump light intensity and the injection intensity (the amount of the feedback input) of the FPGA and the amount of the magnetic field term Fv that is also electrically set. However, as shown in FIG. 3, it is understood that the spiking neuron apparatus according to this embodiment causes the transition between Type I and Type II by setting the value of the relative intensity ratio $P/J_{wv}$ of the pump light intensity P and coupling coefficient $J_{wv}$ determined by the injection intensity of the FPGA.

In addition, the spike stops occurring at the magnetic field term intensity Fv of a certain value and the critical magnetic field intensity is determined by a function of $P/J_{wv}$. Using these properties, the relative values of the parameters P, $J_{wv}$, and Fv of the light-electron mixed system may be estimated correctly.

Control of Dynamics Speed of Spiking Neurons

Generally, in the neurons of a biological system, there is a difference in the dynamics speed (time of evolution, time scale) between a membrane potential v of one spiking neuron at a certain timing and a variable w representing inactivation of the spiking neuron at the same timing. However, the spiking neuron apparatus according to this embodiment uses $J_{vw}$ and $J_{wv}$ (=−$J_{vw}$) as a coupling coefficient between an optical pulse v and an optical pulse w and simulates one spiking neuron with two homogeneous OPO pulses. So, there is no difference in the dynamics speed between v and w.

In the spiking neuron apparatus according to this embodiment, the implementer may control the dynamics speed by (1) adjusting the pump light intensity or (2) setting the absolute values of the two coupling coefficients between two optical pulses differently. These techniques will be described below.

(1) Technique by Adjusting Pump Light Intensity

Figure 4:
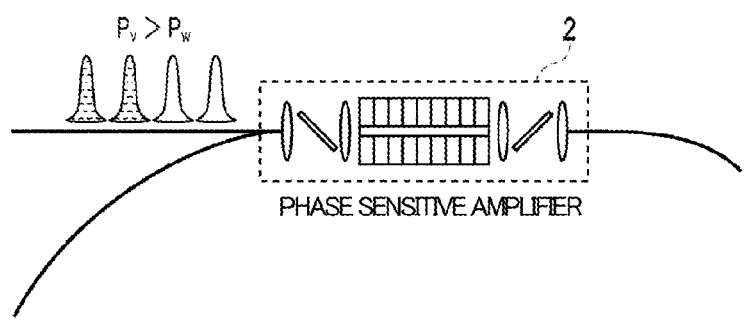
FIG. 4 illustrates a configuration for adjusting a pump light intensity.

FIG. 4 illustrates a configuration for adjusting the pump light intensity. As shown in FIG. 4, the phase sensitive amplifier 2 increases (or decreases) the intensity $p_w$ of the pump light injected to the optical pulse w than the intensity $p_v$ of the pump light injected to the optical pulse v. In this case, the intensity $p_v$ (or $p_w$) of the pump light may be changed continuously to zero. Continuous change may provide finer control of the dynamics speed.

In addition, not only changing the pump light intensity, but allowing the phase sensitive amplifier 2 to inject the pump light only to one of the optical pulses may adjust the pump light intensity injected to one of the optical pulses to 0. Injecting the pump light only to one of the optical pulses is, in other words, cutting the pump light injection to the other optical pulse.

Cutting the pump light injection generates a reverse process of the parametric oscillation in the phase sensitive amplifier 2. A spiking network may thus be created that includes two optical pulses from the normal OPO and the reverse process OPO. Therefore, cutting the pump light injection to the other optical pulse may control the dynamics speed as well as increase the complexity by the normal OPO and the reverse process OPO.

(2) Technique by Setting Absolute Values of Two Coupling Coefficients Between Two Optical Pulses Differently This technique changes the absolute values of the coupling coefficients Jvw and Jwv of two OPO pulses computed by the computing unit 4. For example, a matrix $J_{ij}$ including the coupling coefficients may be set as follows.

Formula 7

$$J_{ij} = \begin{pmatrix} & v_1 & v_2 & v_3 & w_1 & w_2 & w_3 \\ & 0 & 0 & 0 & rJ_{vw} & 0 & 0 \\ & 0 & 0 & 0 & 0 & rJ_{vw} & 0 \\ & 0 & 0 & 0 & 0 & 0 & rJ_{vw} \\ & J_{wv} & 0 & 0 & 0 & 0 & 0 \\ & 0 & J_{wv} & 0 & 0 & 0 & 0 \\ & 0 & 0 & J_{wv} & 0 & 0 & 0 \end{pmatrix}$$

Assuming that in the matrix $J_{ij}$, the ratio of the time scale (dynamics speed) between the optical pulse v and the optical pulse w is τ, it may be characterized as τ=$r^{-1/3}$. This ratio τ includes the power of ⅓ because the equation of expression (3) includes a non-linear term of $v^3$ on the right side of dv/dt.

Simulation of Model of Spiking Neurons

In the spiking neural network, the FitzHugh-Nagumo model is known that simplifies and expresses the action potential of electrically excitable cells such as the nerve cells. This model is known as a model that simplifies the differential equation of the Hodgkin-Huxley model that models activation and inactivation of the action potential firing (spike) of the nerve cells. This model may be represented by only two differential equations as shown in expressions (5) and (6).

Formula 8

$$\frac{dv}{dt} = v - v^3 - w + I_{ext} \qquad (5)$$

Formula 9

$$\tau\frac{dw}{dt} = v - bw - a \qquad (6)$$

In expressions (5) and (6), v represents the membrane potential of a spiking neuron of interest and w represents a variable that represents inactivation for spiking neurons. Iext represents an external stimulation current that is input to the spiking neural network. τ represents a time scale difference between v and w. The a and b are predetermined constants. The above differential equation represents the speed of dynamics of v and the speed of dynamics of w.

In the spiking neuron apparatus according to this embodiment, the implementer may implement the above differential equation on the optical pulse that propagates in two ring resonators that configure the coherent Ising machine. In this case, the configuration may include a ring resonator with a PSA 2 like FIG. 1 and a ring resonator without a PSA 2 unlike FIG. 1.

Figure 5:
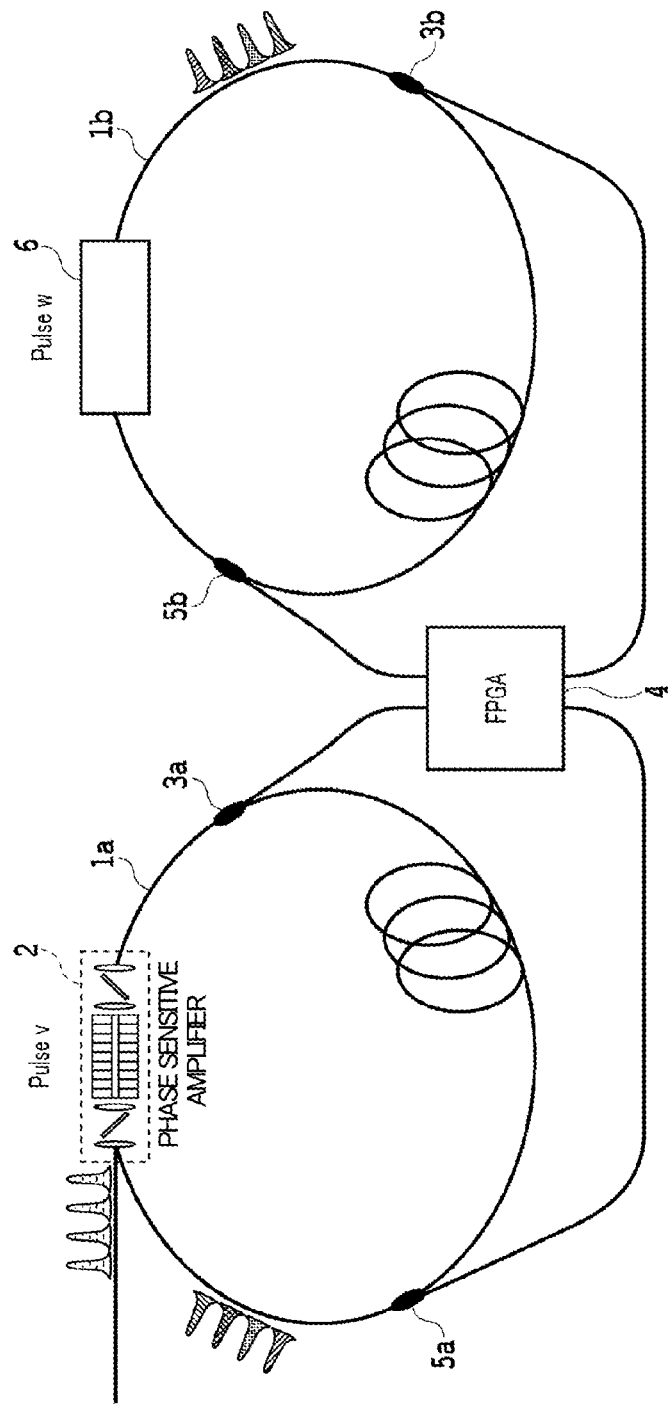
FIG. 5 shows an example configuration of a spiking neuron apparatus for simulating the FitzHugh-Nagumo model.

FIG. 5 shows an example configuration of a spiking neuron apparatus for simulating the FitzHugh-Nagumo model. This configuration includes two individually formed ring resonators 1a and 1b. The ring resonator 1a has a phase sensitive amplifier 2 provided in its path. The ring resonator 1b has a loss/gain introducer 6 provided in its path instead of the phase sensitive amplifier. Two coherent Ising machines are configured by a common computing unit 4. Although measurement units 3a and 3b and external optical pulse input units 5a and 5b are simplified in FIG. 5, they are assumed to have the same configurations as in FIG. 1.

The loss/gain introducer 6 is a means for introducing a loss or gain to the optical pulse. For example, an amplifier for introducing a gain, such as an erbium doped optical fiber amplifier (EDFA), or an attenuator for introducing a loss may be used as the means. In another aspect, the computing unit 4 may add a loss or gain without the loss/gain introducer 6 provided. For the computing unit 4 adding a loss or gain, the size of the coupling coefficient used in computing may be adjusted.

The ring resonators 1a and 1b shown in FIG. 5 are used to implement the optical pulse v on the ring resonator 1a and implement the optical pulse w on the ring resonator 1b. In this case, the parameters in the coherent Ising machine may represent two differential equations of the FitzHugh-Nagumo model as shown in expressions (7) and (8).

Formula 10

$$\frac{dv}{dt} = (p-1)v - v^3 - J_{vw}w + F_v \qquad (7)$$

Formula 11

$$\tau\frac{dw}{dt} = J_{ww}w - J_{wv}v + F_w \qquad (8)$$

Expression (7) shows the time evolution of the optical pulse v in the ring resonator 1a with the phase sensitive amplifier 2 provided in its path. Expression (8) shows the time evolution of the optical pulse w in the ring resonator 1b without the phase sensitive amplifier 2 provided in its path.

In expression (7), the first term on the right side is a term determined by the phase sensitive amplifier 2, p represents the pump light intensity, and v represents the size of the optical pulse v computed by the coherent Ising machine having the phase sensitive amplifier 2. The second term on the right side represents the affect from the optical pulse w, $J_{vw}$ represents the coupling coefficient representing the affect from the optical pulse w, and w represents the amplitude of the optical pulse w computed by the coherent Ising machine without the phase sensitive amplifier 2. Fv is the magnetic field term that corresponds to $I_{ext}$ in expression (5).

In expression (8), the first term on the right side represents a loss or gain provided by the loss/gain introducer 6, $J_{ww}$ is the coupling coefficient representing the affect received by the optical pulse w from the size of its own optical pulse, and w is the size of the optical pulse w computed by the coherent Ising machine without the phase sensitive amplifier 2. The second term on the right side represents the affect from the optical pulse v, $J_{vw}$ is the coupling coefficient representing the affect from the optical pulse v, and v represents the size of the optical pulse v computed by the coherent Ising machine having the phase sensitive amplifier 2. Fw is the external magnetic field, τ is the difference of the time evolution (dynamics speed) between v and w, and v and w result from the difference of the loss or gain in the respective optical paths.

As described above, the implementer may simulate the FitzHugh-Nagumo model with the parameters p, Jwv, Jwv, and Fv of the spiking neuron apparatus configured by the coherent Ising machine shown in FIG. 5 and the computed v and w. Additionally, these parameters may be set to compute v and w, the computed v and w and other parameters may be used to compute expressions (7) and (8), thus computing the activation and inactivation in the action potential firing (spike) of the nerve cells represented by the two differential equations in the FitzHugh-Nagumo model.

Figure 6:
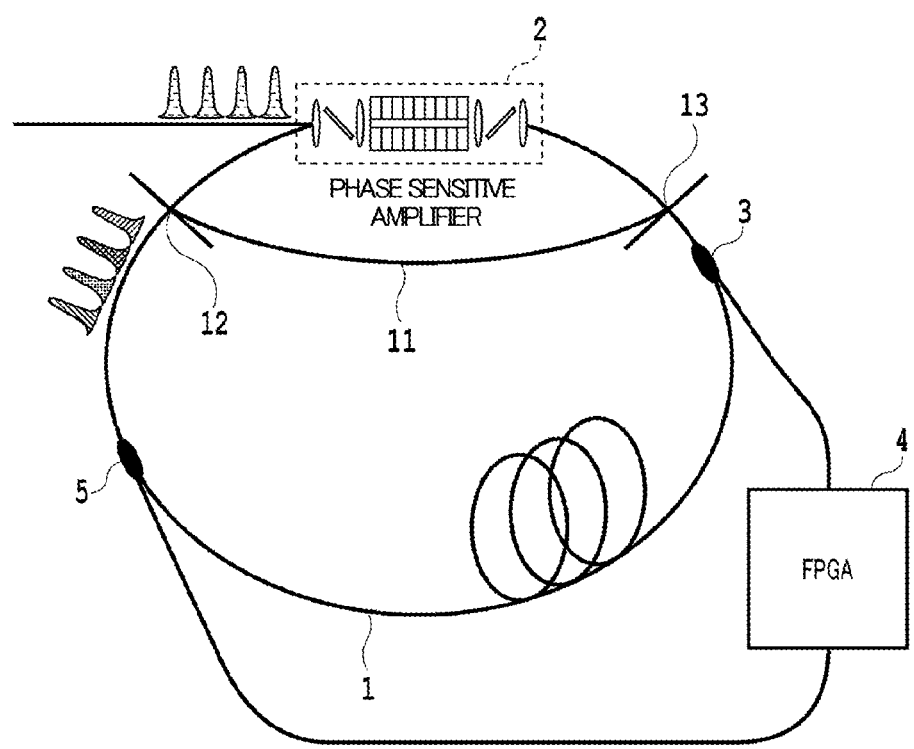
FIG. 6 shows another example configuration of the spiking neuron apparatus for simulating the FitzHugh-Nagumo model.

FIG. 6 shows another example configuration of the spiking neuron apparatus for simulating the FitzHugh-Nagumo model. In this configuration, a part of the ring resonator 1 in one coherent Ising machine is split to provide another path 11 that does not pass through the phase sensitive amplifier 2. A split switch 12 is provided on the way in the ring resonator 1 to direct only the optical pulse w to a different path 11 at a predetermined timing. After propagating the different path 11, the optical pulse w passes through a coupler 13 at which the paths meet and propagates again in the ring resonator 1. The length of the different path 11 is configured to be the same as the length of the ring resonator 1 from the split switch 12 to the coupler 13. In this configuration, the gain or loss introduced to the optical pulse w is introduced by the computing unit 4. The spiking neuron apparatus of this configuration may also simulate the FitzHugh-Nagumo model like the spiking neuron apparatus in FIG. 5. The spiking neuron apparatus may compute the activation and inactivation action potential firing (spike) of the nerve cells represented by the two differential equations in the FitzHugh-Nagumo model.

The spiking neuron apparatus according to this embodiment may simulate the FitzHugh-Nagumo model as well as various models of the spiking neurons. In other words, by well adjusting the parameters of the following expressions (3) and (4) that the optical pulse follows, the spiking neuron apparatus may simulate various models of the spiking neurons including the FitzHugh-Nagumo model.

Formula 12

$$\frac{dv}{dt} = (p-1)v - v^3 - J_{vw}w + F_v \quad (3)$$

Formula 13

$$\frac{dw}{dt} = (p-1)w - w^3 - J_{wv}v + F_w \quad (4)$$

Computing Combinatorial Optimization Problem Using Spiking Neuron Apparatus

The spiking neuron apparatus according to this embodiment may be used to solve the combinatorial optimization problem.

If the spiking neuron apparatus according to this embodiment is configured using the coherent Ising machine shown in FIG. 1, the computing unit 4 computes by the following expression (2) using the measurement result Cj of the optical pulse that is subjected to the coherent measurement by the measurement unit 3.

Formula 14

$$\alpha_i = \Sigma_j J_{ij} C_j + F_i \quad (2)$$

The above procedure is the same as in the technique of simulating the spiking neurons. In solving the combinatorial optimization problem, the coupling coefficient used in expression (2) computed by the computing unit 4 is different from that used in simulating the spiking neurons. As the combinatorial optimization problem, Max Cut problem will be described by way of example.

Max Cut problem is equivalent to Ising problem without the magnetic field term and is expressed by a coupling matrix Kij (N×N matrix). Thus, the computing unit 4 may only compute the following coupling coefficient with Fi=0 in expression (2).

$$J_{ij} = \begin{pmatrix} 0 & 0 & 0 & rJ_{vw} & 0 & 0 \\ 0 & 0 & 0 & 0 & rJ_{vw} & 0 \\ 0 & 0 & 0 & 0 & 0 & rJ_{vw} \\ J_{wv} & 0 & 0 & 0 & K_{12} & K_{13} \\ 0 & J_{wv} & 0 & K_{21} & 0 & K_{32} \\ 0 & 0 & J_{wv} & K_{13} & K_{23} & 0 \end{pmatrix} \quad \text{Formula 15}$$

In the coherent Ising machine, the computing unit 4 may compute expression (2) using the above Jij to compute Max Cut problem. In the matrix Jij (2N×2N matrix), the matrix Kij of Max Cut problem is input in the lower right (4-6 rows inclusive and 4-6 columns inclusive) and the same effect will be provided even when the matrix Kij is input in the upper left (1-3 rows inclusive and 1-3 columns inclusive).

$V_i$ and $w_i$ (values representing the Ising spin) obtained by computing expression (2) with the matrix Jij are the solution of Max Cut problem. Here, the obtained two solutions finally converge to the same value.

Here, it is known that in the coherent Ising machine, feedback light from the computing unit 4 has an inverted phase relative to the pulse train, generating a phase inversion problem periodically. The phase inversion problem inverts the sign of Jij, resulting in a lower percentage of correct answers. The phase inversion problem may be solved by setting the coupling coefficient Jij used in expression (2) as follows.

$$J_{ij} = \begin{pmatrix} 0 & 0 & 0 & rJ_{vw} & K_{12} & K_{13} \\ 0 & 0 & 0 & K_{21} & rJ_{vw} & K_{32} \\ 0 & 0 & 0 & K_{13} & K_{23} & rJ_{vw} \\ J_{wv} & 0 & 0 & 0 & 0 & 0 \\ 0 & J_{wv} & 0 & 0 & 0 & 0 \\ 0 & 0 & J_{wv} & 0 & 0 & 0 \end{pmatrix} \quad \text{Formula 16}$$

By computing with the coupling coefficient, the relative phases of v and w invert at the same time, making it possible to solve the phase inversion problem.

In the matrix Jij, the matrix Kij of Max Cut problem is input in the upper right (1-3 rows inclusive and 4-6 columns inclusive) and the same effect will be provided even when the matrix Kij is input in the lower left (4-6 rows and 1-3 columns inclusive).

According to the spiking neuron apparatus according to this embodiment, implementing the spiking neural network using the OPO pulses may allow for high speed processing using light, and additionally, allow for free control of parameters that are difficult to electrically control.

Computing of More General Ising Problems

Max Cut problem is thought to be a sort of Ising problem. In other words, Max Cut problem corresponds to a problem in which the magnetic field term hi=0 in Hamiltonian of Ising Model in expression (1). Here, expression (2) computed by the computing unit 4 may be extended as follows.

$$\alpha_i = \sum_j J_{ij} c_i + F_i |c_i| \quad \text{Formula 17}$$

By introducing the magnetic field term hi of Ising problem to the magnetic field term Fw related to ith w, the spiking neuron apparatus according to the present invention may solve the Ising problem represented by expression (1).

REFERENCE SIGNS LIST

1 Ring resonator
2 PSA (phase sensitive amplifier)
3 Measurement unit
4 Computing unit
5 External optical pulse input unit

The invention claimed is:
1. A spiking neuron apparatus using a coherent Ising machine, the coherent Ising machine including:
a resonator unit for amplifying a plurality of optical pulses;

a measurement unit for measuring phases and amplitudes of the optical pulses to obtain a measurement result; and a feedback configuration for computing and feeding back an interaction related to a certain optical pulse using a coupling coefficient of Ising Model on the basis of the measurement result, the feedback configuration feeding back correlation determined by two coupling coefficients with opposite signs to two predetermined optical pulses of the plurality of optical pulses, the spiking neuron apparatus simulating a state of a spiking neuron using values of two optical pulses finally obtained by the measurement unit.

2. The spiking neuron apparatus according to claim 1, wherein the resonator unit includes a ring resonator for circulating and propagating the optical pulses and a phase sensitive amplifier for amplifying the optical pulses with an injected pump pulse, and wherein an intensity of the pump pulse injected to one of the two predetermined optical pulses is different from an intensity of the pump pulse injected to the other of the two predetermined optical pulses for the phase sensitive amplifier.

3. The spiking neuron apparatus according to claim 1, wherein one of the two predetermined optical pulses passes through a phase sensitive amplifier provided in the resonator unit and the other of the two predetermined optical pulses does not pass through the phase sensitive amplifier provided in the resonator unit.

4. The spiking neuron apparatus according to claim 3, wherein the resonator unit includes a first ring resonator for circulating and propagating one of the two predetermined optical pulses, a second ring resonator for circulating and propagating the other of the two predetermined optical pulses, and a phase sensitive amplifier for amplifying the optical pulses with an injected pump pulse, and wherein the phase sensitive amplifier is provided only in the first ring resonator.

5. The spiking neuron apparatus according to claim 3, wherein the resonator unit includes a ring resonator for circulating and propagating optical pulses and a phase sensitive amplifier for amplifying the optical pulses with an injected pump pulse, the phase sensitive amplifier being provided in the ring resonator, and wherein a different path is provided for propagating optical pulses split from the ring resonator in parallel with a path passing through the phase sensitive amplifier of the ring resonator.

6. A combinatorial optimization problem calculation device that maps a combinatorial optimization problem to a coupling coefficient of the spiking neuron apparatus according to claim 1.

* * * * *